H. HODGSON.
Bee Hive.
No. 52,571. 2 Sheets—Sheet 1.
Patented Feb. 13, 1866.
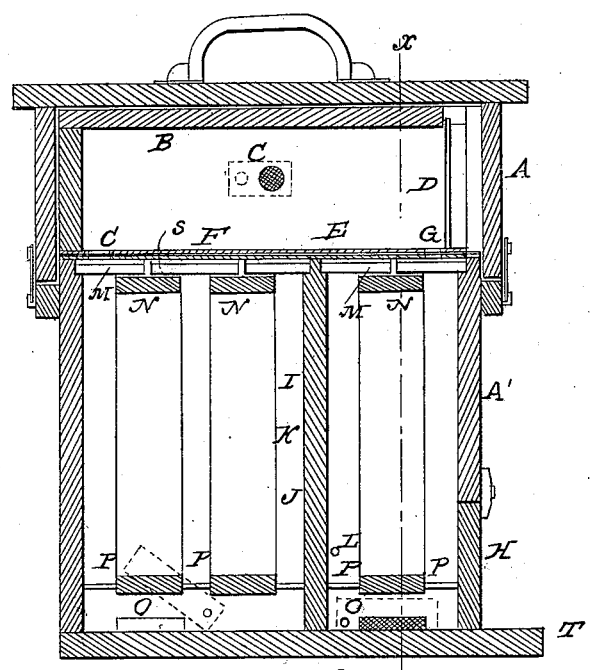
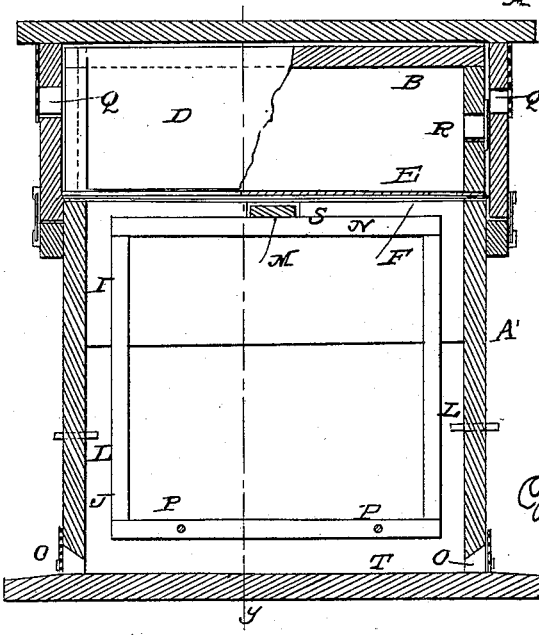
WITNESSES.
INVENTOR
Henry Hodgson
By Munn & Co
Attorneys H. HODGSON.
Bee Hive.

No. 52,571.

2 Sheets—Sheet 2.

Patented Feb. 13, 1866.

WITNESSES

INVENTOR
Henry Hodgson
By Munn & Co
Attorneys

UNITED STATES PATENT OFFICE.

HENRY HODGSON, OF FREMONT, OHIO.

IMPROVEMENT IN BEE-HIVES.

Specification forming part of Letters Patent No. 52,571, dated February 13, 1866.

*To all whom it may concern:*

Be it known that I, HENRY HODGSON, of Fremont, in the county of Sandusky and State of Ohio, have invented a new and useful Improvement in Bee-Hives; and I do hereby declare that the following is a full, clear, and exact description thereof, which will enable others skilled in the art to make and use the same, reference being had to the accompanying drawings, forming part of this specification, in which—

Figure 3:
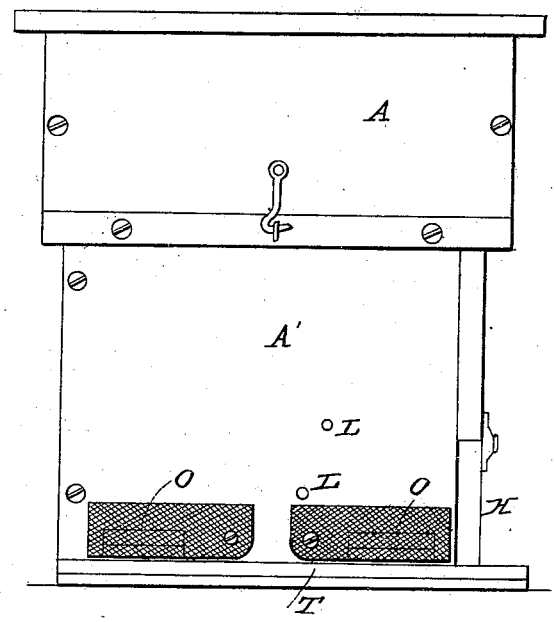
Figure 4:
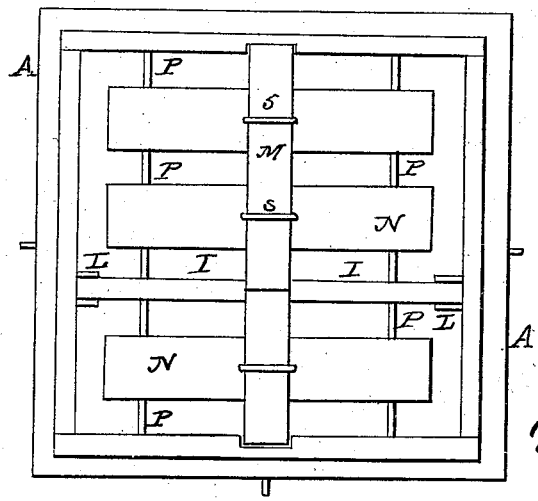

Figure 1, Sheet 1, is a vertical section, on the line $y$ of Fig. 2, of a bee-hive made according to my invention. Fig. 2 is a vertical section on the line $x$ of Fig. 1. Fig. 3 is an outside elevation. Fig. 4 is a plan, the cover and upper box having been removed.

The object of this invention is, among other things, to enable one to rear a queen bee in a separated part of a bee-hive without disturbing the whole swarm, and to provide a mode of promoting that condition in a colony of bees known as "swarming." It consists in a peculiar manner of constructing and operating the bee-hive, the comb-frames being removable at pleasure, and the lower part or main body of the hive being capable of conversion into two separate hives at pleasure with independent entrances, and the top of the hive containing a removable box, which can be isolated from the lower or main part of the hive or put in communication with it, at pleasure.

A designates an upper part, and A' a main or lower part, of a bee-hive, the two chambers being made independent of each other, and being attached together by hooks on the outside, as seen in the drawings. The upper part A is separated from the part A' by a movable and loose metallic diaphragm or plate, F, which rests upon the sides of the part A' or upon shoulders formed on the sides. The plate F has holes G in it near its edges on all its four sides, which coincide with like holes made in the metallic bottom plate of an upper comb-box, B, that is wholly covered by the part A of the hive. The part A has air-holes Q on opposite sides, said holes being covered by perforated metallic plates which exclude insects, but admit air to the upper part of the hive for the purpose of ventilation.

The box B is made of wood except on its bottom, which is of metal, perforated with holes G, as above stated, and except one of its sides D, which is of glass and made removable. One of the wooden sides of this box B has also an opening, C, to which is fitted a perforated swinging plate, so that said opening can be left wholly unobstructed or be closed, so that air alone is allowed admission. When the box B is set on the division-plate F in the manner seen in the drawings, the holes G in the bottom of the box and in the plate coincide, and the bees can have access to the box from all portions of the lower part, A'; but when the box is turned one-quarter around, or when the loose plate F is so turned, the holes C will not coincide and the box B will then be isolated. Such isolation is necessary when the bees are rearing a queen, or when two queens are in the hive at the same time to prevent them from getting into the upper box. One of the sides of the part A' of the hive has along its lower edge a shutter, H, which is held shut by a button. The object of this shutter is to allow access to the bottom of the hive for the purpose of cleaning it, and for the purpose of examining a swarm without disturbing the bees when flying in and out, the bee passages or openings being on different sides from that on which the shutter is placed.

The lower part, A', is divided into two unequal parts by a vertical partition composed of a fixed piece, I, and a lower movable piece, J. The lower edge of the piece I and the upper edge of the piece J are beveled in opposite directions, so that when brought together their sides will be even, and the two will form a continuous vertical partition from top to bottom of the lower part, A', of the hive. When the movable piece J is in the hive, as shown in the drawings, it is held in place by pins L, inserted from without.

The letters N designate movable comb-frames, which are suspended by staples $s$ from bars M M', whose ends rest on shoulders made in the sides of the part A' of the hive and on the upper edge of the partition I. In this example I have shown only one comb-frame, N, in the division on the right-hand side of the partition, and two frames, N, on the left-hand side; but there may be two or more frames on the right-hand side and three or more on the left-hand side, according to the size of the hive. The lower parts of the frames are provided with steady-pins P, which extend from either side and keep the frames from contact with the sides of the hive and partition and of each other. The bottom T is made wider on three sides than the body of the hive, so as to form a platform on those sides.

The letter O designates openings through which the bees have access to the hive. There are four of them, two on one side and two on the side opposite, and they are so placed that the openings on the same side of the hive lead into it on different sides of the partition I J. The said openings are provided with perforated tin buttons, so that any of them can be shut at pleasure.

It will be observed that by placing the openings G leading into the upper box along the sides of the plates E and F, the bees reach them by going between the frames and the sides of the hive without going through the combs. The plates E F are, moreover, made very thin, so that the bees have the least possible amount of travel in reaching the upper box, and such box is thereby brought so near to the main swarm that the bees at work in the box will work much faster for that reason.

The movable part J of the partition I J is only placed in the hive when preparations are to be made for rearing a new queen and for swarming. At other times it is left out, except when used for any other special purpose.

The hive, as before said, is calculated for swarming bees artificially and having queens fertile in both swarms when swarmed. This I do in the following-described manner: In the spring, before the time for swarming, when drones begin to fly, I open the hive, lift out the bar having the smaller number of frames suspended upon it, put the movable partition J in place, look over the frames taken out to see if the queen is on them. If she is found, I put her in the other apartment, put the frames in place as before, turn the surplus-box B half-way round, so that the passages in its bottom do not agree with those in the plate F, as the bees should not go into the top box while rearing a queen. I have now made a complete separation on the inside of the hive, and, as the bees are flying out on two sides of the hive alike, I next make a separation on the outside. In order to do this I shut down one of the perforated tin buttons over a fly-passage, O, on one side, thus causing all the bees that fly in and out on that side to enter one apartment or division. I next turn to the opposite side of the hive and shut the button on the diagonally-opposite corner, thereby causing all the bees on that side of the hive to pass into the other division or apartment. I now have the bees completely divided. The apartment that has no queen will go directly to rearing one, and in about twenty days she will fly out to become fertile. When she returns to the hive she will enter the same side she went out. The bees are now ready for swarming; and I am enabled by my invention to make a sure thing of artificial swarming. I bring up a new hive, open both the old and new hives, take out the rod having the larger number of frames on it from the old hive, and place it directly in the new hive, bees, combs, and all. I then fill the balance of both hives with empty frames, take out the movable partitions, close both up, turn the surplus-box back so that the passages correspond with those in the plate F, remove both a little from the old stand, when the thing is done, and the swarms will be found to be very nearly equal and both to have good fertile queens, and no time is lost in rearing them. They are now ready to begin the honey harvest before natural swarming usually begins. If swarms are wanted more than honey the same process is gone through with in each hive again, and four swarms made from one.

Having thus described my invention, I claim as new and desire to secure by Letters Patent—

1. In the construction of bee hives, suspending the comb-frames from removable bars M M', in combination with the vertical partition I J, substantially as and for the purpose above set forth.

2. Dividing a hive by means of a partition, I J, made substantially as shown, in connection with making entrance-ways provided with perforated movable covers on two opposite sides or ends of each division, so that when one division is isolated from the other the entrance to each can be established on opposite sides, substantially as described.

3. In bee-hives which have a lower main hive and a surplus upper box, a perforated movable metallic sheet or plate, F, on the top of the main box or hive and a perforated metallic bottom on the surplus-box, the perforations in which are made to coincide, or are made not to coincide, for the purpose above explained, by changing the position of the surplus-box, substantially as described.

HENRY HODGSON.

Witnesses:
I. L. WILLI,
JOHN ELWELL.